United States Patent
Fukushima

[15] 3,644,030
[45] Feb. 22, 1972

[54] LIGHT SOURCE SYSTEM

[72] Inventor: Yoshio Fukushima, Tokyo, Japan
[73] Assignee: Kabushiki Kaisha Ricoh, Tokyo, Japan
[22] Filed: July 8, 1969
[21] Appl. No.: 839,936

[30] Foreign Application Priority Data

July 12, 1968 Japan...................................43/49223

[52] U.S. Cl................................................................353/98
[51] Int. Cl.........................................................G03b 21/28
[58] Field of Search................240/106.1; 350/172; 353/66, 353/99, 98; 128/21

[56] References Cited

UNITED STATES PATENTS

| | | |
|---|---|---|
| 1,763,482 | 6/1930 | Scheppmann...........................353/66 |
| 2,216,993 | 10/1940 | Von Wedel..............................353/98 |
| 2,356,592 | 8/1944 | Kolbert...............................240/41.15 |
| 2,454,332 | 11/1948 | Mitchell...............................240/106.1 |
| 2,715,352 | 8/1955 | Jobe........................................350/172 |
| 2,853,599 | 9/1958 | Kliegl..................................240/106.1 |
| 3,222,986 | 12/1965 | Altman....................................353/66 |

*Primary Examiner*—Leonard Forman
*Assistant Examiner*—A. J. Mirabito
*Attorney*—Burgess, Ryan and Hicks

[57] ABSTRACT

A light source system for a projection system wherein a reflecting mirror having an observation window formed through a center portion thereof is inclined in front of a projector and an object illuminated by light beam from a ring-shaped light source or ring-shaped light source image is projected upon a reflex reflecting screen through said reflecting mirror so that the projected image may be viewed through the observation window.

4 Claims, 8 Drawing Figures

PATENTED FEB 22 1972 3,644,030

INVENTOR

YOSHIO FUKUSHIMA

BY Burgess, Ryan & Hicks
ATTORNEYS

INVENTOR
YOSHIO FUKUSHIMA

LIGHT SOURCE SYSTEM

BACKGROUND OF THE INVENTION

The present invention relates to a light source system and more particularly a light source system for a projection system utilizing a reflex reflecting screen.

There has been known a reflex reflecting projection screen in which the light incident thereupon may be reflected in the direction of its light source. The reflex reflecting screen consists of a large number of small glass beads having a suitable index of reflection intimately arrayed so as not to be overlapped with each other upon a light reflecting substance layer. The rear semispherical surface of each of the glass beads is embedded into the layer so that the light rays entering into the glass bead are reflected by the rear spherical surface in the direction of their light source. Thus, a light image projected upon the reflex reflecting screen is reflected toward the projection lens of a projector. However, an observer must stand at a position of or adjacent to the projection lens to observe clearly the image projected upon the screen, which is very inconvenient in practice. Therefore, there has been proposed a projection system in which a semitransparent reflecting mirror is disposed inclined forwardly of the projection lens and the light is reflected by this semitransparent reflecting mirror and projected upon the screen so that the projected image may be viewed through the reflecting mirror by an observer standing at a position symmetrical to the projection lens with respect to the semitransparent reflecting mirror. However, this projection system invites the loss of light when passing through the semitransparent reflecting mirror.

In view of the above, one of the objects of the present invention is to provide an improved projection system which will not use the semitransparent mirror, thereby eliminating the defect as described above.

Another object of the present invention is to provide a novel light source system best suited for a projection system utilizing a reflex reflecting projection screen.

A further object of the present invention is to provide an improved projection system utilizing a non-ring-shaped light source which will bring about the same effect as in the case of utilizing a ring-shaped light source.

A still further object of the present invention is to provide a novel light source system which forms a ring-shaped light source image having a suitable size.

SUMMARY OF THE INVENTION

In brief, the present invention is characterized by the provision of a ring-shaped light source for a projection system in order to eliminate the loss of light due to the provision of an observation window formed through a totally reflecting mirror which is used instead of the semitransparent mirror. The image of the ring-shaped light source is formed through a light source optical system forwardly of a projection lens so that the effective light beam originating from the ring-shaped light source may be almost completely reflected toward the screen by the reflecting mirror, thereby eliminating the loss of light due to the observation window formed through the reflecting mirror. Thus, the uniform illuminance of the projected image may be ensured and the image upon the screen can be viewed only through the observation window of the reflecting mirror.

According to one embodiment of the present invention, a ring-shaped light source is a ring-shaped tubular lamp while in other embodiments, a ring-shaped light source image may be optically formed from a non-ring-shaped light source. The latter light source system of the present invention is advantageous because a ring-shaped light image having a suitable size may be easily formed.

The above and other objects, features and advantages of the present invention will become more apparent from the following description of the illustrative embodiments thereof with reference to the accompanying drawings.

BRIEF DESCRIPTION OF THE DRAWINGS

The same reference numerals are used to designate the same parts throughout the figures.

DESCRIPTION OF THE PREFERRED EMBODIMENTS

Figure 1:
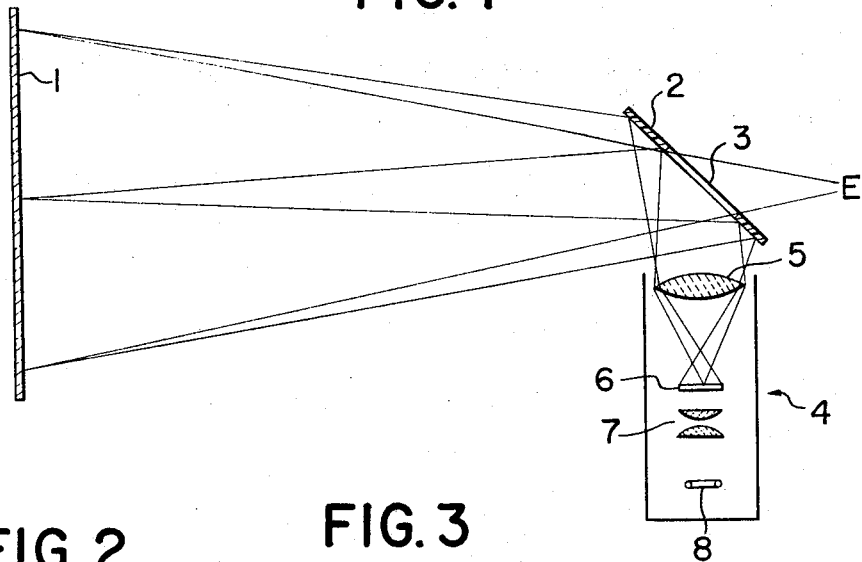
FIG. 1 is a diagrammatic longitudinal sectional view of one embodiment of the present invention applied in a projection system.
Figure 2:
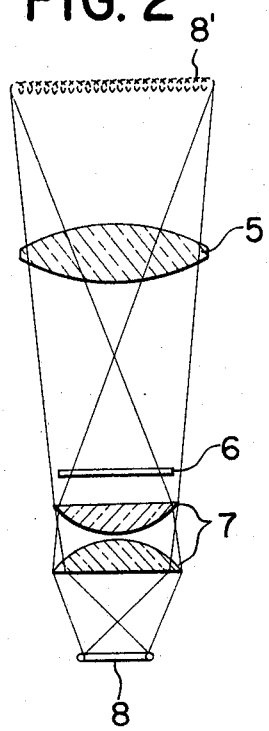
FIG. 2 is a longitudinal sectional view of one embodiment of the present invention.
Figure 3:
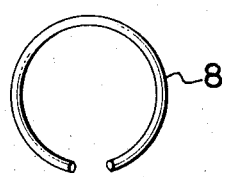
FIG. 3 is a plan view of a ring-shaped light bulb of the present invention.
Figure 4:
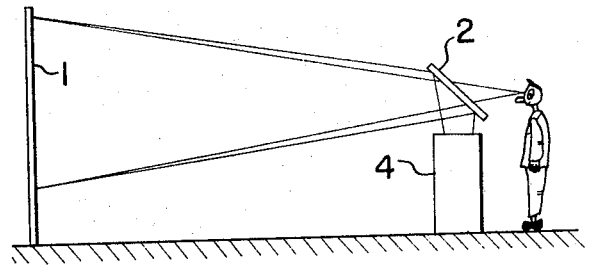
FIG. 4 is a diagrammatic side view of an optical projection system to which is applied the present invention.

Referring to FIG 1, reference numeral 1 designates a reflex reflecting screen; 2, a reflecting mirror having a viewing observation window 3 formed at the center portion thereof; and 4, an optical projector comprising a projection lens 5, an object or original 6 to be projected, a light source optical system 7 and a ring-shaped light source 8, which may be provided by forming a tubular Iodine gas lamp into a ring shape, as shown in FIG. 3. As shown in FIG. 2, an image 8' of the filament of the ring-shaped lamp 8 is formed forwardly of the projection lens 5 so that the light originated by the lamp 8 may be completely reflected by the mirror 2 having the observation window 3.

The image of the object or original 6 projected upon the reflex reflecting screen 1 may be observed clearly only at the position E in FIG. 1. Since the reflex reflecting screen reflects the light beams toward their light source, that is the projector, a plurality of different objects may be projected upon the common projection screen from a plurality of projectors each being disposed at a different angle relative to the screen and the different projected images may be observed through the observation windows of the respective projectors. For example, a plurality of projectors of the type described with reference to FIGS. 1 to 3 may be disposed in side-by-side relation relative to the projection screen 1 for projection of different objects and an observer may view through the observation window of the reflecting mirror of each projector only the image projected by this projector upon the common screen 1.

It is rather difficult and expensive to fabricate the ring-shaped lamp as shown in FIG. 3 and it is also difficult to fabricate such ring-shaped lamp having suitable dimensions. Therefore, as shown in FIGS. 5 to 8 the inventor has studied and succeeded in providing a novel light source system which can optically form a ring-shaped light source image from a conventional lamp as a light source.

Figure 5:
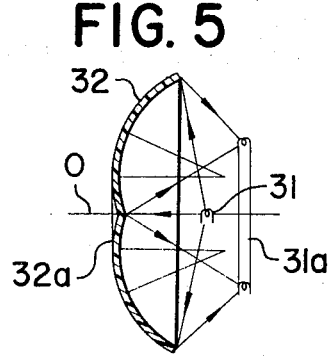
FIG. 5 is a diagrammatic longitudinal sectional view of another embodiment of a light source system according to the present invention.
Figure 7:
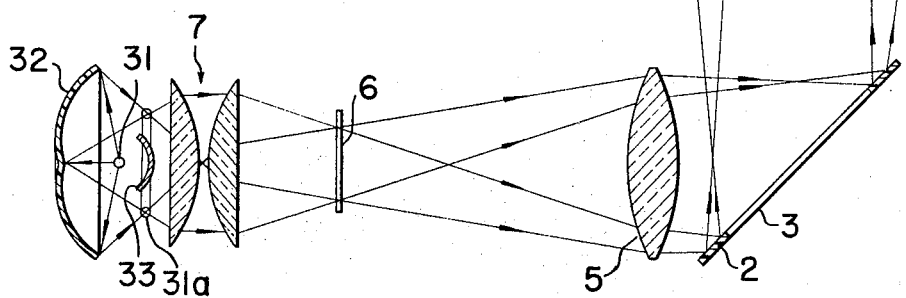
FIG. 7 is a partial diagrammatic longitudinal sectional view of an optical projection system to which is applied the light source system shown in FIG. 5.

Referring to FIG. 5, reference numeral 31 designates a light source while 32 designates a convex reflecting mirror. The reflecting surface of the mirror 32 may be generated by revolution of an arc (see FIG. 7) about the axis O. It will be noted that the vertex of this reflecting surface becomes a circular ring-shaped vertex line 32a. The light originated from the light source 31 is reflected by the convex reflecting mirror 32 and is focused in the line connecting the center of the arc and the light source 31, thereby forming a ring-shaped light source image 31a. As shown in FIG. 7, the light source 31 and the convex reflecting mirror 32 of the character described above are disposed at the back of the light source optical system. The provision of a convex reflecting mirror 33 between the reflecting mirror 32 and the ring-shaped image 31a of the light source 31 will serve to more effectively utilize the light rays from the light source 31. The projection system shown in FIG. 7 utilizing the above-described light source system projects an object in the similar manner as described in the first embodiment with reference to FIG. 1 so that no detailed description will be made.

Figure 6:
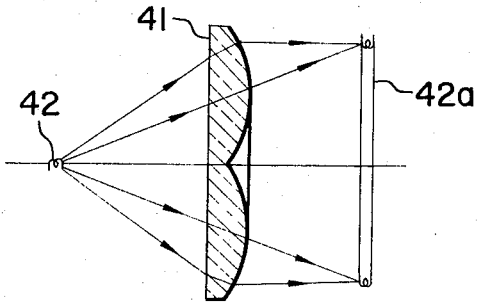
FIG. 6 is a further embodiment thereof.
Figure 8:
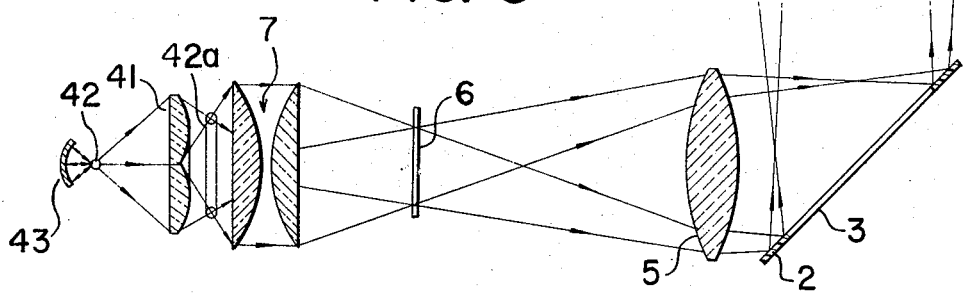
FIG. 8 is a partial diagrammatic longitudinal sectional view of an optical projection system to which is applied the light source system shown FIG. 6.

In the third embodiment of the present invention, instead of the convex reflecting mirror 32 of the character described above, a ring-shaped cylindrical lens 41 as shown in FIG. 6 may be used for forming a ring-shaped light source image 42a from the light source 42 by the lens 41. The light source system shown in FIG. 6 may be used in a projection system as shown in FIG. 8. That is, the light source 42 and the lens 41 are disposed at the back of the light source optical system and the provision of the convex reflecting mirror 43 at the back of the light source 42 will be advantageous for effective use of the light rays originated from the light source 42. The above ring-shaped light source image 31a or 42a may be focused again by the light source optical system (condenser lens) 7 forwardly of the projection lens 5 so that a sharp image having uniform brightness may be projected. It will be understood that the above-described convex reflecting mirror 32 and the ring-shaped cylindrical lens 41 may be combined in practice when required.

It is to be noted that the position and the size of the light source image may be suitably varied by displacing the light source in the second and third embodiment described above.

I claim:
1. A light projection system comprising
a reflecting projection screen;
a reflecting mirror angularly disposed with respect to said screen, said reflecting mirror having a central observation opening therein;
an optical projection unit having an optical axis parallel with the plane of said screen, said optical axis passing through said opening;
said projection unit having an object positioned therein to have its image thereof projected on said screen;
a projection lens mounted between said object and said reflecting mirror;
a light source spaced from said object on the side remote from said reflecting mirror, and a light source optical system located between said object and said light source; and
said light source having a curved configuration to produce a ring-shaped light source image on said reflecting mirror for reflection on to said projection screen.

2. A light projection system according to claim 1 in which said light source comprises a ring-shaped lamp.

3. A light projection system according to claim 1 in which said light source comprises a substantially point origination, a first convex reflecting mirror is provided adjacent said light source remote from said object, said first convex reflecting mirror having a ring-shaped vertex line, a second convex reflecting mirror is provided adjacent said light source between said light source and said object, and the light from said light source reflected between said convex reflecting mirrors forms a ring-shaped light source image in the area substantially surrounding said second convex reflecting mirror.

4. A light projection system according to claim 1 in which said light source comprises a substantially point origination, a ring-shaped cylindrical lens is provided between said light source and said object, a convex reflecting mirror is provided adjacent said light source remote from said object, and the light from said light source is reflected from said convex reflecting mirror through said lens to form a ring-shaped light source image between said lens and said object.

* * * * *